United States Patent [19]
Dole et al.

[11] Patent Number: 5,603,508
[45] Date of Patent: Feb. 18, 1997

[54] GASKET FOR LATERAL OUTLET SEGMENTED PIPE COUPLING

[75] Inventors: Douglas R. Dole, Whitehouse Station, N.J.; Vance W. Henry, Easton, Pa.

[73] Assignee: Victaulic Company of America, Easton, Pa.

[21] Appl. No.: 650,193

[22] Filed: May 20, 1996

[51] Int. Cl.⁶ ........................................ F16J 15/12
[52] U.S. Cl. .................. 277/1; 277/101; 277/206 R; 285/197; 285/198; 285/199
[58] Field of Search ........................ 277/101, 206 R; 285/197, 198, 199; 137/317, 318

[56] References Cited

U.S. PATENT DOCUMENTS

| | | | |
|---|---|---|---|
| 3,362,730 | 1/1968 | St. Clair et al. | 285/108 |
| 3,664,691 | 5/1972 | Nakamara | 277/206 |
| 4,613,171 | 9/1986 | Corcoran | 285/199 |

Primary Examiner—William A. Cuchlinski, Jr.
Assistant Examiner—Christina Annick
Attorney, Agent, or Firm—Abelman, Frayne & Schwab

[57] ABSTRACT

A sealing gasket for a segmented pipe coupling includes radially extending, axially spaced sealing lips interconnected by an axially extending bridge member which has at least one aperture extending through the bridge member in a radial direction, a tubular collar being received within the aperture, the tubular collar being fast with an arcuate elongate plate, the longitudinal edges of which are engaged with mutually presented surfaces of the sealing lips.

10 Claims, 5 Drawing Sheets

FIG.5
PRIOR ART
FIG.6
PRIOR ART
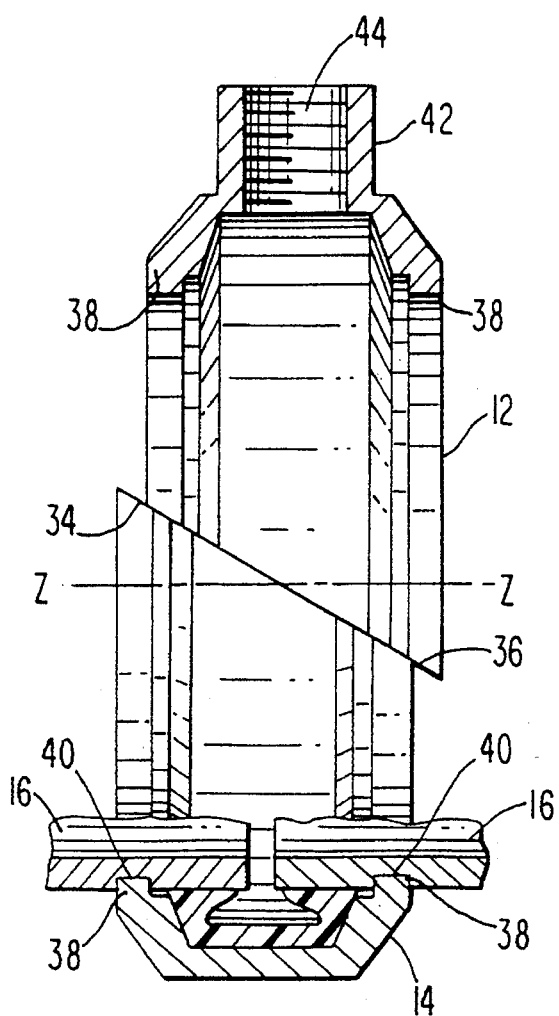
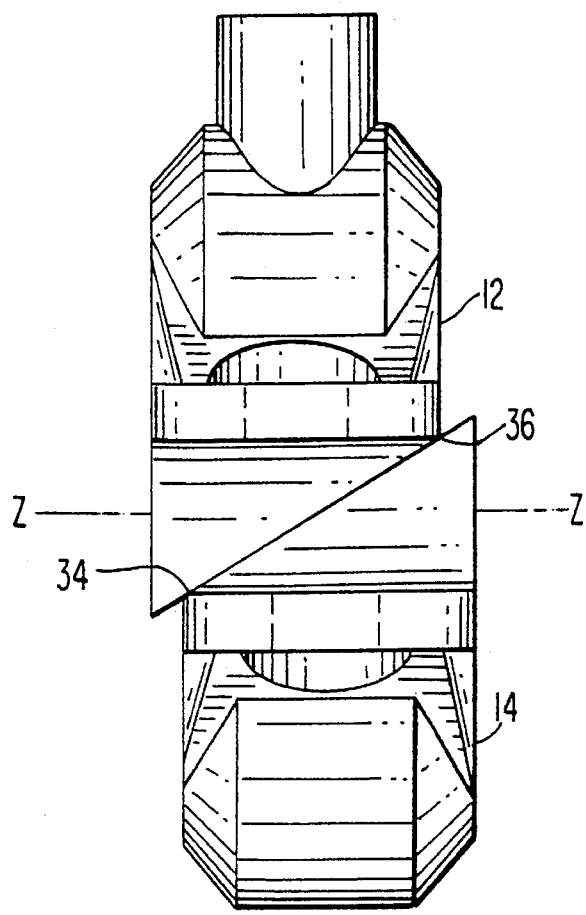

5,603,508

GASKET FOR LATERAL OUTLET SEGMENTED PIPE COUPLING

FIELD OF THE INVENTION

This invention relates to a segmented pipe coupling providing a lateral outlet, for example, a T-coupling or a double T-coupling, and in particular, relates to a novel form of sealing gasket assembly for use in conjunction with such a coupling.

BACKGROUND OF THE INVENTION

Segmented pipe couplings are well-known in the art. Those couplings employ two or more coupling segments having retaining keys that are received in grooves in the adjacent ends of pipes, the coupling segments embracing the pipes in encircling relation, and being secured one to the other in end-to-end relation by traction bolts.

Segmented pipe couplings providing a lateral outlet also are well-known in the art, for example, from St. Clair et al., U.S. Pat. No. 3,362,730, one or each of the coupling segments providing a lateral outlet for the connection of a lateral outlet pipe. Either a single one of the coupling segments can be provided with the lateral outlet to provide a T-coupling, or, in the alternative, both or each of the coupling segments can be provided with a lateral outlet to provide a double T-coupling, the possibility being that there are more than two coupling segments each of which is provided with a lateral outlet, for example, four such coupling segments providing an X-coupling.

Such couplings incorporate a sealing gasket that spans the adjacent ends of the pipes, and provides the required sealing of the coupling.

The prior art teachings are of a circular recess surrounding the lateral outlet opening in the coupling segment, in which a circular boss provided on the sealing gasket is received. The circular boss was found to be essential, in that the opening extending radially of the sealing gasket provided a source of leakage behind the sealing gasket, and also a source of structural weakness in the sealing gasket, that, under operational conditions, could cause the radially inwards collapse of the sealing gasket away from the containing coupling segment.

However, the provision of a radially extending boss on the sealing gasket, of necessity required the molding of the cylindrical boss at the time the sealing gasket itself was molded. Further, if more than one lateral outlet was to be provided by the coupling, then, a corresponding sealing gasket having two or more cylindrical bosses had to be provided, in order to provide the required sealing at the respective lateral outlets.

Thus, the sealing gasket for a specific form of lateral outlet coupling differed from a sealing gasket to be employed with a different form of lateral outlet coupling. This, in turn, involved the provision of a multiplicity of molding dies of different configuration, which in turn required separate warehousing, inventory control, and related complexities.

Clearly, it would be a major advantage if a gasket structure could be provided that is standard to any form of lateral outlet, regardless of the number of lateral outlets to be provided. So doing would very significantly reduce the manufacturing costs of such gaskets, the number of molds required for the production of a sealing gasket for a specific outside diameter of pipe then being reduced to one, as opposed to the requirement for a multiplicity of molding dies in order to produce sealing gaskets of the same nominal diameter, but which were intended for use with lateral outlet couplings of differing configuration, which include variants of T-couplings, Y-couplings, X-couplings, and, couplings having lateral outlets located in other configurations, for example, a single gasket segment providing two or more lateral outlets.

As will be apparent from the proceeding discussion, a great variety of molding dies have to be provided to meet specific requirements of lateral outlet segmented pipe couplings. As also will be appreciated, considerable savings in manufacturing costs can be effected in the event that a single sealing gasket of any particular standard size can be employed to provide any number of lateral outlets in any desired configuration of angular displacement, without the necessity of having to provide a specific mold for each specific organization of lateral outlets of a specific lateral outlet segmented pipe coupling.

So doing would enormously reduce the costs of molding dies, would greatly simplify warehousing control, and would greatly reduce the storage warehousing requirements.

Known forms of lateral outlet segmented pipe couplings require an asymmetrical sealing gasket having a radially extending protuberance that extends into the lateral outlet in sealing relation with the interior of the coupling segment providing the lateral outlet, the provision of the radial protuberance constituting an additional complication in the molding of the sealing gasket, with a consequential increase in the cost thereof, and, additionally, requiring the warehousing and inventory control of additional non-standard gaskets.

The reason for providing the radial protuberance on the sealing gasket is, more particularly, required in order to control seepage behind the sealing gasket and lifting of the sealing gasket away from the containing gasket segment, any such lifting action acting further to increase seepage and leakage in a direction circumferentially of the sealing gasket and of the containing segmented pipe coupling.

St. Clair et al. U.S. Pat. No 3,362,730, then requires lugs to be provided on the gasket exterior that are clamped between the adjacent end faces of the respective coupling segments, this further complicating the gasket molding procedures, and increasing the costs thereof.

Shohan U.S. Pat. No. 2,874,979 teaches an irrigation coupling having a lateral outlet, and which incorporates a sealing gasket of C-shaped cross-sections, the sealing gasket being devoid of any radial protrusion for reception within the laterally extending outlet, and aperture being provided in the axially extending outer wall of the sealing gasket, in order to permit fluid to flow between the respective pipes and the lateral outlet.

This, however, requires that the outlet aperture be provided in the relatively weak axially extending outer wall of the sealing gasket, the consequence then being that, when under pressure, the axially extending outer-wall of the sealing gasket can collapse away from the containing coupling, thus permitting seepage circumferentially of the gasket exterior and out of the coupling.

While this is of little consequence in an irrigation system, it is of particular consequence in the event that the pipe line is intended to convey flammable or noxious fluids, or, in the case of a fire extinguishing system, which must be left under full pressure for extended periods of time and be entirely free of leakage and dripping.

When tightening down a segmented pipe coupling as is known in the art, the legs of the sealing gasket are placed under appreciable compression, and, unless prevented from so doing, will attempt to rotate away from the radially extending inner walls of the coupling segments.

This tendency in a conventional sealing gasket is resisted by the axially extending radially outer wall of the sealing gasket, which itself is placed under axial compression in addition to the radial compression produced by tightening down of the coupling segments.

If, however, a radially extending aperture is provided through the axially extending radially outer wall of the sealing gasket, then, as was recognized by St. Clair in U.S. Pat. No. 3,362,730, some form of reinforcement must be provided at that location, which is accomplished by St. Clair in providing a tubular protuberance on the outer surface of the gasket. This, however, carries with it the requirement that the coupling segment must be correspondingly formed to accommodate the radially extending protuberance, this in turn resulting in added weight in the coupling segment, increased complexity in forming the coupling segment, and consequentially an increase in cost of the coupling segment, all of which considerations are of significance in the fabrication of an extensive pipe line assembly.

In the absence of some reinforcement in the location of the aperture in the axially extending outer wall of the sealing gasket, the sealing gasket can, at that location, move radially inwardly of the pipe coupling, this in turn presenting a channel through which fluid can seep in directions circumferentially within the coupling segments, and also axially within the coupling segments, with seepage occurring at the keys and at the adjacent bolting faces of the coupling segments.

OBJECT OF THE INVENTION

It is an object of this invention to provide a sealing gasket for a segmented pipe coupling providing a lateral outlet, in which the possibility of seepage between the contained sealing gasket and the interior of the coupling segments is eliminated to the greatest possible extent, without requiring a sealing boss to be formed on the exterior of the sealing gasket, and in turn eliminating the complexities in the manufacture of the containing gasket segment in order to accommodate such a protuberance.

SUMMARY OF THE INVENTION

According to the present invention, an essentially incompressible support member is positioned within the sealing gasket, the support member having a tubular portion that is a close fit within the aperture in the axially extending outer wall of the sealing gasket, the tubular portion being supported by an essentially compressible plate that extends axially within the sealing gasket into engagement with the opposite radially extending side walls of the sealing gasket.

In a preferred embodiment of the invention, the axially extending plate is held captive at its opposite axial edges within recesses formed within the respective radially extending walls of the gasket.

In this manner, the essentially incompressible radially extending tubular wall of the insert absorbs axially extending forces produced in the radially outer axial wall of the gasket, thus to prevent rotation of the side walls of the sealing gasket away from the walls of the containing coupling segment, while at the same time the axially extending plate is operative to prevent radially inwards collapse of the axially extending radially outer wall of the gasket, and to maintain that wall in compressive engagement with the inner wall of the coupling segment.

Additionally, in the event that the axially extending wall of the insert is confined at its axially opposite edges within recesses in the radially extending walls of the sealing gasket, then, upon radially inwards compression of the sealing gasket, a radially outwards force is exerted on the plate, via the gasket lips, and in turn on the axially extending radially outer wall of the sealing gasket acting to force the axially extending radially outer wall of the sealing gasket into compressive sealing engagement with the inner wall of the containing gasket segment.

As there is no radially extending protuberance on the outer surface of the sealing gasket, there is no requirement for the coupling segment to accommodate such a protuberance, thus reducing the unit cost of the associated coupling segment.

Additionally, and most importantly, the sealing gasket can be manufactured by conventional molding techniques, and then, the radially extending aperture in the axially extending radially outer wall of the gasket can be punched through the gasket, thus eliminating the complexities of molding a sealing gasket having the radially extending aperture formed therein during the molding operation.

Additionally, the opportunity exists of employing a standard sealing gasket for the subsequent formation into a sealing gasket providing any combination of lateral outlets.

DESCRIPTION OF THE DRAWINGS

The invention will now be described with reference to the accompanying drawings, which illustrate preferred embodiments of the invention, and in which:

FIGS. 4–6 illustrate a prior art coupling as known from Rung, U.S. Pat. No. 4,611,839 when adapted to provide a lateral outlet segmented pipe coupling;

DESCRIPTION OF THE PRIOR ART

Figure 1:
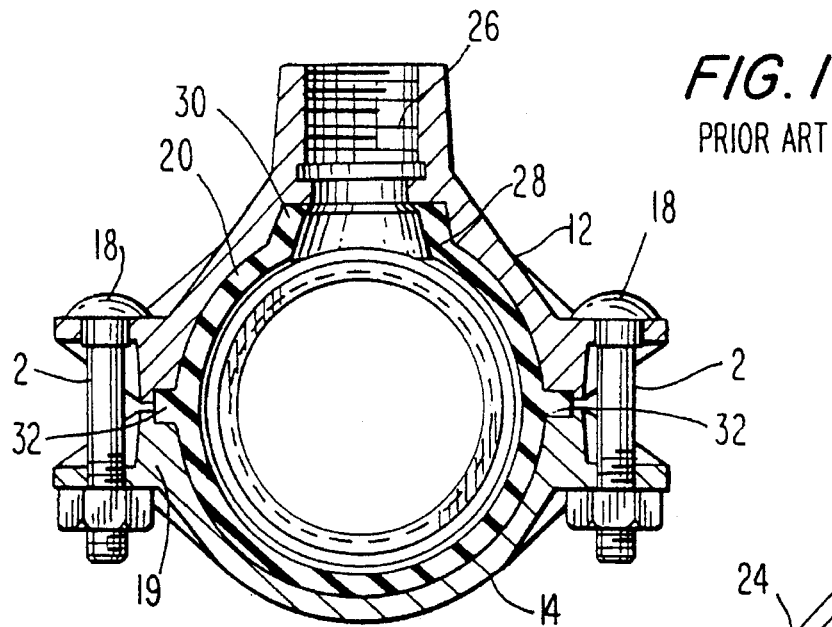
FIG. 1 is a transverse cross-section through a prior art form of lateral outlet segmented pipe coupling providing a T-coupling.
Figure 2:
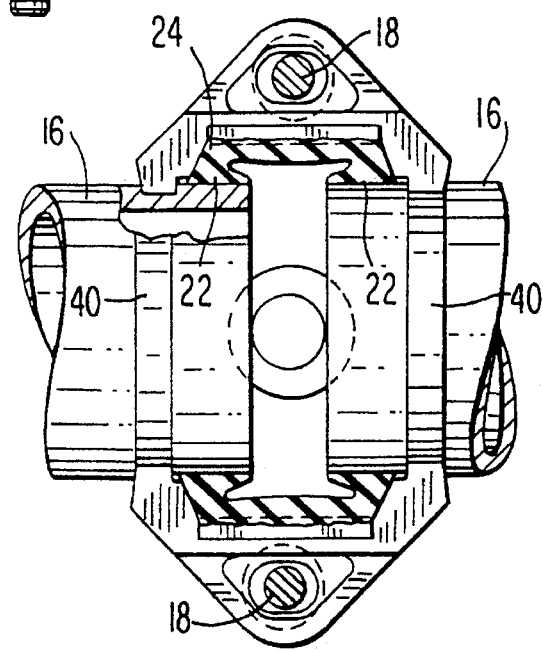
FIG. 2 is a cross-section of the prior art coupling of FIG. 1 taken on the line 2—2 in FIG. 1.
Figure 3:
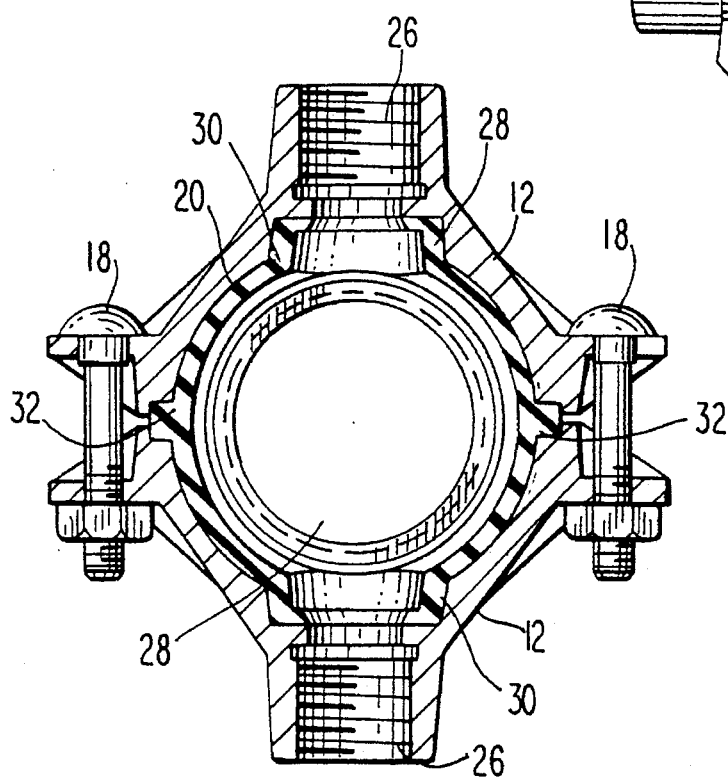
FIG. 3 is a view corresponding with FIG. 1 of a prior art lateral outlet segmented pipe coupling providing double-T-coupling.

Referring now to FIGS. 1, 2 and 3, which illustrate lateral outlet couplings as disclosed in St. Clare et al., U.S. Pat. No. 3,362,730 issued Jan. 9, 1968, and assigned to the Assignee in the present application, the segmented pipe coupling as shown is comprised of two coupling segments one or both of which comprises a lateral outlet coupling segment 12, and the other of which, if employed, constitutes a standard coupling segment 14. In FIG. 1 a lateral outlet coupling segment 12 employed in conjunction with a standard coupling segment 14 to provide a T-coupling. In FIG. 3, two identical lateral outlet couplings are provided in just a position to provide a double T-coupling.

In both examples the coupling segments are secured to each other in encircling relation with the adjacent ends of grooved pipes 16 by means of traction bolts 18.

The respective coupling segments encircle and embrace a sealing gasket 20 having axially extending sealing lips 22 that embrace the outer peripheries of the respective pipes and provide the required seal therewith against leakage in an axial direction along the outer surface of the respective pipes.

The respective sealing lips 22 are interconnected by a bridge member 24, which completes the sealing between the pipe ends.

The coupling segments 12 providing the lateral outlets each include an internally threaded boss 26 for the reception of a laterally extending pipe (not shown), and additionally, include a cylindrical recesses 28 for the reception of a cylindrical sealing boss 30 molded intregally with the sealing gasket 20.

The requirement for the cylindrical sealing boss is mandated in order to provide structural support for the sealing gasket at the location of the outlet, and in order to minimize or inhibit seepage circumferentially of the outer surface of the sealing gasket towards the end faces of the segmented couplings, which, if permitted, would result in seepage out of the space between the juxtaposed end faces of the respective coupling segments.

Having recognized this problem, the prior technique of eliminating such seepage in a direction radially of the bolting faces was to provided axially extending sealing ribs 32 that are held under compression between the end faces of the respective coupling segments 12 or 14, this representing an additional complication in the molding of the sealing gasket.

As later taught by Rung in U.S. Pat. No. 4,611,839 issued Sep. 16, 1986, the requirement for axial sealing ribs 32 was eliminated, by arranging for the end faces of the respective coupling segments to directly engage each other, as illustrated in FIGS. 5 and 6, thus eliminating the requirement for axially extending sealing ribs as previously proposed, the sealing gasket 20 then being incapable of extrusion in the radial direction, that being a major source of problems in the earlier prior art construction.

Figure 4:
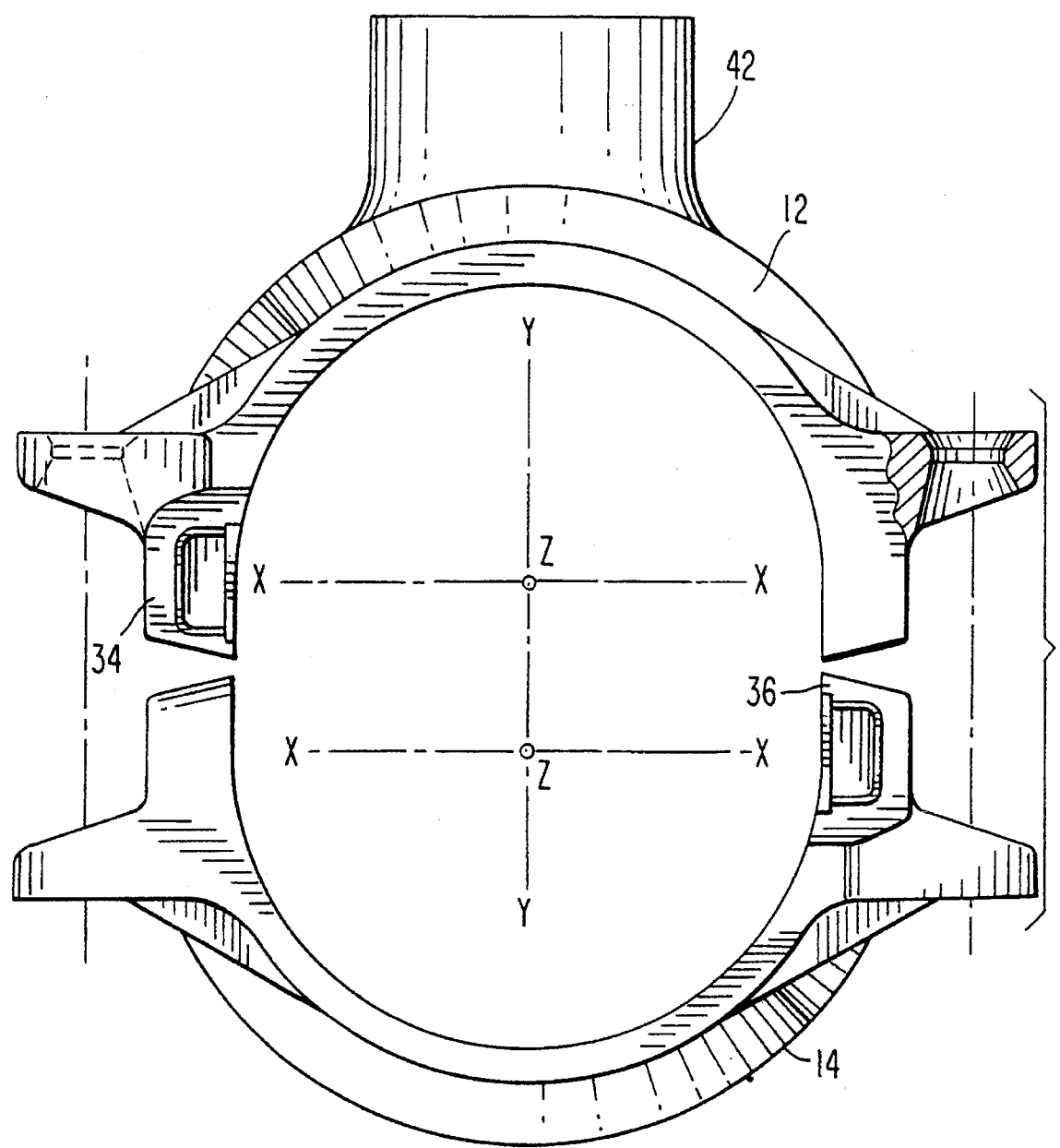

While the basic form of coupling segments illustrated in FIGS. 4, 5 and 6 is to be considered as prior art, the formation of one of those coupling segments 12 to provide a lateral outlet is not prior disclosed. However, the formation of one or more of the coupling segments as a lateral outlet is well-known from the earlier references, in view of which FIGS. 4, 5 and 6 are acknowledged to be prior art.

As will be seen in FIG. 4, the respective coupling segments include oppositely inclined end faces 34 and 36 that, upon tightening down of the coupling permit the respective ends of the coupling segments 12 and 14 to move oppositely relative to each other along the Z—Z axis, in order to provide a rigid pipe coupling in which the keys 38, FIG. 5, on the inner circumference of the coupling segments can move oppositely along the Z—Z axis in order for them to engage opposite side walls of the grooves 40 provided in the ends of the respective pipes 16.

As seen in FIG. 4, the coupling segment 12 is provided with a lateral extension 42, which, as illustrated in FIG. 5 is bored and threaded at 44 for the reception of the threaded end of a pipe.

DESCRIPTION OF THE PREFERRED EMBODIMENTS

Figure 7:
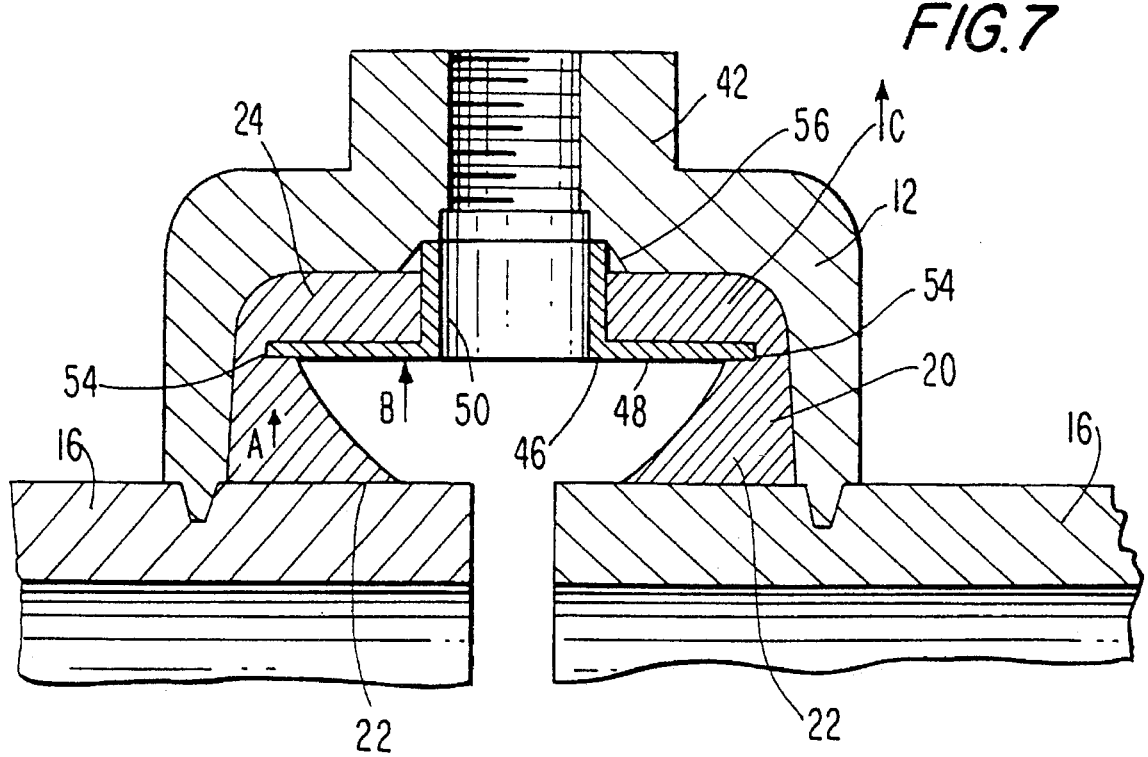
FIG. 7 illustrates in transverse cross-section a coupling segment providing a lateral outlet, and a sealing gasket according to the present invention.
Figure 8:
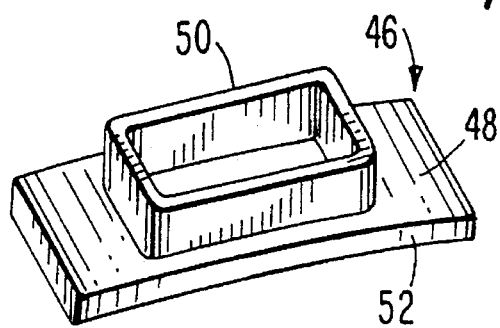
FIGS. 8 and 9 are perspective views illustrating alternative forms of the essentially incompressible support member of the present invention.
Figure 9:
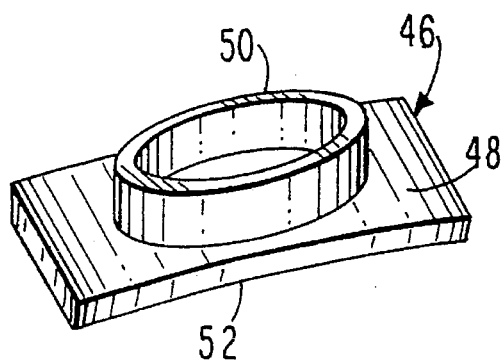
Figure 10:
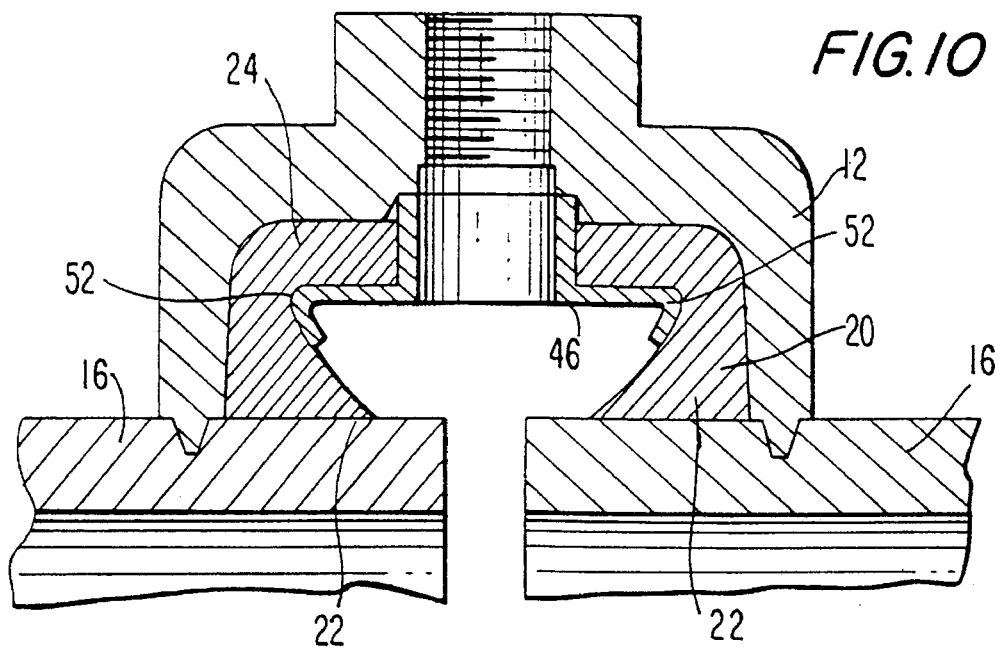
FIG. 10 is a view corresponding with FIG. 7, and illustrating a modification of the essentially incompressible support member.

The preferred embodiments of the invention are illustrated in FIGS. 7–13, of which FIGS. 7 and 10 represent a transverse cross-section through the coupling members 12, i.e., a cross-section extending longitudinally of the pipes 16.

Referring now to FIG. 7, the sealing gasket 20, which similarly incorporates sealing lips 22 and a bridging member 24 is totally devoid of the cylindrical boss 30 of the prior art.

The elimination of the cylindrical boss 30 of the prior art is made possible by means of an incompressible support member 46 comprised of an arcuate metal plate 48 having a central aperture surmounted by a tubular sleeve 50.

The arcuate metal plate can be of any desired length, and is formed of a curvature concentric with the outer periphery of the sealing gasket 20. The width of the arcuate metal plate 48 in FIG. 7 is sufficient for the circumferentially extending edges thereof 52 to be received in circumferentially extending grooves 54 that have been molded interiorly of the sealing gasket 20 during the molding thereof.

The support member 48 thus provides a positive support for the bridge member 24 at the location of the aperture formed therein for reception of the tubular sleeve 50, which inhibits radially inwards collapsing of the bridge member 24 in that location, thus to maintain a continuous seal between the coupling segment 12 and the outwardly presented surface of the bridge member 24 of the sealing gasket 20.

The sealing capability of the bridge member 24 is further enhanced by movements within the sealing gasket 20 that occur during the clamping down of the respective coupling segments on to the exterior of the respective pipes 16.

Upon clamping down of the coupling segments, the respective lips of the sealing gasket are compressed in a radially outwards direction as indicated by the arrow A. This in turn results in an outward compressive movement of the support member 46 in the direction of the arrow B, and in turn results in an increased compressive force exerted in the bridge member 24 in the direction of the arrow C, thus to further insure correct seating of the bridge member 24 on the juxtaposed surface of the coupling segment 12 at locations surrounding the tubular sleeve 50.

While the tubular sleeves 50 need only be of a height corresponding with the radial thickness of the bridge member, for convenience in assembling the coupling, preferably they are made slightly in excess of the thickness of the bridge member 24 for them to protrude radially outwards of the gasket 20 to a small extent, the interior of the coupling segment 12 being recessed at 56 in order to accommodate the free end of the tubular sleeve 50.

In this manner, after the sealing gasket and its contained support member 46 has been positioned over the pipe ends, the coupling segment 12 readily can be moved circumferentially relative to the gasket until such time as the tubular sleeve 50 snaps into the recess 56, this giving a positive indication that the coupling segment is properly assembled in relation to the sealing gasket 20 and the tubular sleeve 50.

Figure 11:
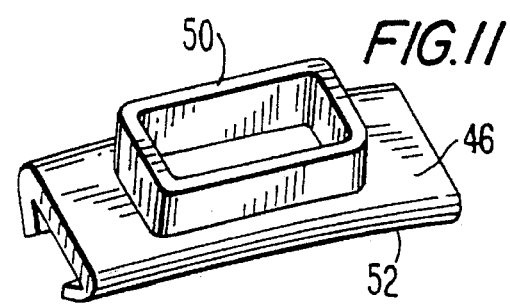
FIGS. 11 and 12 are views corresponding with FIGS. 8 and 9 illustrating the modification of the essentially incompressible support member.
Figure 12:
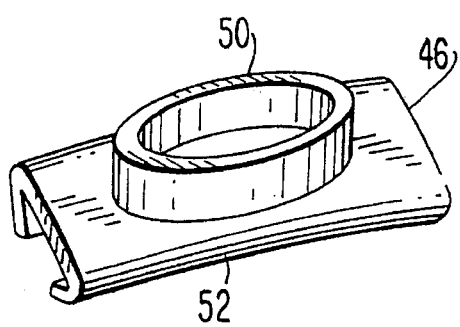

FIGS. 10, 11 and 12 illustrate a modification of FIGS. 7, 8 and 9, in which the circumferentially extending edges 52 of the support member 46 are downwardly and inwardly extended for them to fit snugly within the respective sealing lips 22 in the absence of circumferentially extending grooves molded within the sealing gasket 20, thus enabling an entirely standard sealing gasket to be employed in a segmented pipe coupling having lateral outlets, and even further reducing expenses and complications in the required molds, and further reducing warehousing inventories and associated costs.

Figure 13:
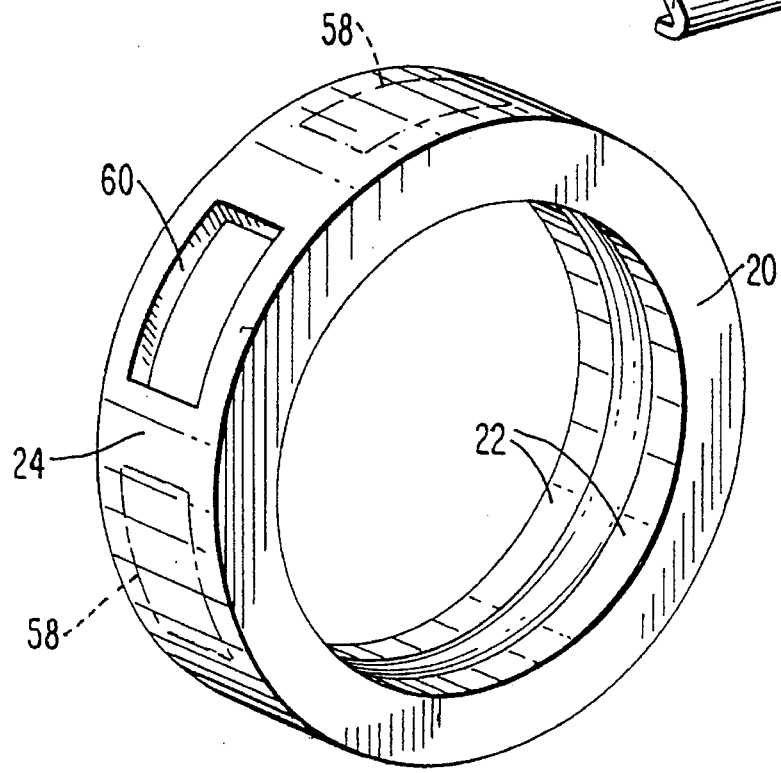
FIG. 13 is a perspective view illustrating a sealing gasket according to the present invention, and, the manner in which that standard sealing gasket can be adapted to any desired configuration of multiple lateral outlets.

FIG. 13, there is illustrated a sealing gasket 20 that either has been molded with internal circumferentially extending grooves 54 as illustrated in FIG. 7, or, which is an entirely standard sealing gasket as illustrated in FIG. 10.

At a selected location, or multiple locations, as indicated by the dotted lines 58, the bridge member 24 is cut using a conventional punch to provide an appropriately configured aperture 60 for reception of the tubular sleeve 50 of a support member 46.

As will become immediately apparent, the aperture 60 can be punched through the bridge member 46 at any desired location circumferentially of the sealing gasket 20, thus to provide for multiple outlets through the sealing gasket, as required by the number of outlets provided by the respective coupling segments of the segmented pipe coupling.

After having punched the aperture of apertures 60 in the bridge member 24 of the sealing gasket, the sealing lips 22 are then deflected radially inwardly of the gasket 20, thus to permit access to the gasket 20 of a support member 46, and, the positioning of the tubular sleeve 50 of the support member 46 within the aperture 60 that has been cut in the bridge member 24.

In this manner, a sealing gasket of a size appropriate to a specific diameter of the pipes is formable into any one of a number of a sealing gaskets specific to a specific number of lateral outlets to be provided by the segmented pipe coupling.

Further, by adopting the modification of FIGS. 10, 11 and 12, a standard sealing gasket can be employed in that manner, provided that the dimensions of the aperture 60 are sufficient to produce a frictional engagement or interference with the tubular sleeve 50 of the support member 46, it then merely being a matter of deflecting the sealing lips 22 away from each other, and then plugging the tubular sleeve of the support member 46 into the aperture 60. Upon release of the respective sealing lips, the sealing lips act to hold the support member 46 in assembled condition within the sealing gasket.

Further modifications will suggest themselves to persons skilled in the art. For example, the tubular sleeve member can be formed other than axially straight or being circumferentially ribbed to further enhance its sealing engagement with the bridge member 24. Also, the arcuate metal plate 48 of the support member can be formed with ridges extending circumferentially of the tubular sleeve 50, again, to further improve localized pressure on the bridge member 24 in order to simulate a labyrinth seal.

While punching of the apertures 60 in the bridge member 24 of the sealing gasket 20 is a preferred manner of providing those apertures, obviously, when producing larger production runs of specific gaskets for a specific purpose, the apertures 60 can be provided during the molding operation as opposed to a subsequent punching or perforation operation.

What is claimed is:

1. A sealing gasket for a segmented pipe coupling, said sealing gasket being of the type including radially extending and axially spaced sealing lips interconnected at an outer periphery of said sealing lips by an axially extended bridge member, further including:

an elongate arcuate plate of an incompressible material positioned between said sealing lips and positioned in engagement with a radially inner surface of said bridge member;

said elongate arcuate plate being supported in that position by the engagement of respective longitudinal edges of said elongate arcuate plate with a juxtaposed one of said sealing lips;

said elongate arcuate plate having an aperture extending between a radially inner and radially outer surface of said plate; and, a tubular collar surrounding said aperture in said plate, and extending radially outwardly of said radially outer surface of said plate;

said collar being received within said aperture provided in said bridge member.

2. The sealing gasket of claim 1, in which said collar is an interference fit within said aperture within said bridge member.

3. The sealing gasket of claim 1, in which said collar extends radially outward of said outer surface of said elongate arcuate plate by a distance at least equal to the thickness of said bridge member.

4. The sealing gasket of claim 1, in which said respective longitudinal edges of said elongate arcuate plate are received within channels provided within said respective sealing lips.

5. The sealing gasket of claim 1, in which said respective longitudinal edges of said elongate arcuate plate extend downwardly and radially inwardly of said elongate arcuate plate, and are compressively engaged by mutually presented radially extending surfaces of said sealing lips.

6. The sealing gasket of claim 1, in combination with a segmented pipe coupling including at least one coupling segment providing a lateral outlet, in which said collar is oriented in alignment with said lateral outlet of said coupling segmented, said bridge member being compressively engaged between said elongate arcuate plate and a juxtaposed inwardly presented surface of said coupling segment.

7. The sealing gasket of claim 6, in which said collar extends radially outwards of said arcuate plate by a distance greater than the thickness of said bridge member, and is received within a recess in said coupling segment providing said lateral outlet.

8. The sealing gasket of claim 6, including multiple of said coupling segments each providing a lateral outlet, a corresponding number of apertures in said sealing gasket, and a corresponding number of elongate arcuate plates positioned internally of said sealing gaskets, and respectively communicating with a selected one of said lateral outlets.

9. A method of constructing the sealing gasket of claim 1, including:

providing a standard sealing gasket having radially extending and axially spaced sealing lips interconnected at an outer periphery thereof by an axially extending bridge member;

providing an aperture in said bridge member;

inserting and incompressible elongate arcuate plate having an aperture surrounded by a radially outwardly extending collar between said respective sealing lips, and passing said radially outwardly extending collar of said elongate arcuate plate through said aperture in said bridge member of said sealing gasket.

10. The method of claim 9, further including providing multiple apertures in said bridge member, and inserting a corresponding number of elongate arcuate plates between said sealing ribs, and, positioning said radially outwardly extending collars of each said elongate arcuate plate within a selected one of said apertures in said bridge member.

* * * * *